United States Patent [19]

Ohtaki et al.

[11] 4,382,666
[45] May 10, 1983

[54] INDICATING DEVICE FOR COMPUTER TYPE ELECTRONIC FLASH APPARATUS

[75] Inventors: Shohei Ohtaki, Yokohama; Zenzo Nakamura, Urawa; Naoki Nagase, Tokyo, all of Japan

[73] Assignee: Canon Kabushiki Kaisha, Tokyo, Japan

[21] Appl. No.: 206,084

[22] Filed: Nov. 12, 1980

Related U.S. Application Data

[63] Continuation of Ser. No. 764,286, Jan. 31, 1977, abandoned.

[30] Foreign Application Priority Data

Feb. 5, 1976 [JP] Japan ............................ 51-11727

[51] Int. Cl.³ .................. G03B 15/05; G06C 3/00; H05B 41/36
[52] U.S. Cl. ............................ 354/33; 354/35; 354/127; 354/149; 315/151; 315/241 P; 362/4; 362/5; 235/64.7; 116/213
[58] Field of Search ................ 354/32–35, 354/60 F, 126–128, 139, 145, 149, 289, 51; 362/5, 4; 116/129 E, 129 F, DIG. 3, DIG. 23, 213; 235/64.7, 78, 88 R, 91 C, 116; 315/241 P, 151, 134

[56] References Cited

U.S. PATENT DOCUMENTS

| | | | |
|---|---|---|---|
| 3,071,056 | 1/1963 | Gebele | 354/127 |
| 3,386,358 | 6/1968 | Kropp | 354/51 |
| 3,903,397 | 9/1975 | Yata et al. | 235/64.7 |
| 3,928,117 | 9/1976 | Betlejewski | 354/127 X |
| 4,023,188 | 5/1977 | Ueda et al. | 354/145 X |
| 4,047,194 | 9/1977 | Nakamura et al. | 354/149 |
| 4,080,612 | 3/1978 | Maitani et al. | 354/126 |

OTHER PUBLICATIONS

Braun 2000 Vario Computer, Instructions for use, West Germany, Nov. 1973.

*Primary Examiner*—William B. Perkey
*Attorney, Agent, or Firm*—Toren, McGeady and Stanger

[57] ABSTRACT

An indicating device of computer type electronic flash apparatus has a plurality of display members representing respective limited distance ranges for correct exposure of an object to be photographed. Each of the display members corresponds to a respective set diaphragm value. The indicating device further includes a plurality of indicating marks provided on the same plane of said display members and corresponding to respective set diaphragm values. With this device, it is possible to be aware of the proper distance range satisfactorily.

7 Claims, 3 Drawing Figures

INDICATING DEVICE FOR COMPUTER TYPE ELECTRONIC FLASH APPARATUS

This is a continuation of application Ser. No. 764,286 filed Jan. 31, 1977, now abandoned.

BACKGROUND OF THE INVENTION

1. Field of the Invention

This invention relates to an electronic flash apparatus for a camera, and more particularly to an indicating device of the electronic flash apparatus for use in flash photography.

2. Description of the Prior Art

In a recently introduced electronic flash apparatus, flash light reflected from an object being photographed is detected and when the light has reached a predetermined level, the flash is stopped. This type of device is hereinafter referred to as a "computer type electronic flash apparatus." Of course, such computer type electronic flash apparatus includes ones capable of selecting a desired diaphragm value.

With flash apparatus, it is impossible to produce proper exposures for very distant objects. Accordingly, the object distance is limited to a particular range for which proper exposure can be made. In addition thereto, this particular range (hereinafter referred to as "proper distance range") varies with at least one exposure control parameter or aperture size. For example, assuming that the flash output of the flash apparatus is GN=16, when an aperture size of F=4 is selected, the corresponding proper distance range becomes 4 (meters), and at F=2, it becomes 8 (meters).

Therefore, even in the case of the latter (diaphragm value selectable) computer type electronic flash apparatus, the proper distance range varies in accordance with the set diaphragm value.

By the way, this proper distance range can be easily calculated from the light amount of the flash apparatus and the set diaphragm value. However, it is very troublesome for the latter computer type flash apparatus to calculate the proper distance range each time the set diaphragm value is changed.

On this account, a solution has been proposed in which an instruction plate having described thereon a list of proper distance ranges corresponding to the respective set diaphragm values is provided as mounted on the back of the computer type electronic flash apparatus (the term "back" means the surface of the electronic flash apparatus which faces the photographer). This third computer type electronic flash apparatus has a preset member for presetting an aperture size positioned on the front surface thereof. Thus, it is first necessary for the photographer to change the angular position of the flash apparatus to read out the preset diaphragm value of the preset member provided on the front surface of the flash apparatus. Thereafter, the operator must again change the angular position of the flash apparatus to look at the instruction plate for the proper distance observation as the instruction plate is mounted on the back surface of the flash apparatus. Otherwise, it is impossible to recognize whether or not the object falls in the proper distance range. This constitutes a very troublesome problem.

SUMMARY OF THE INVENTION

An object of the present invention is to provide an indicating device for computer type electronic flash apparatus which overcomes the above mentioned drawbacks.

Another object of the present invention is to provide an indicating device for computer type electronic flash apparatus in which the indication of the proper object distance range is very easy to read out.

These and other objects of the invention will become apparent from the following detailed description taken in conjunction with the accompanying drawings.

PREFERRED EMBODIMENT OF THE INVENTION

Figure 1:
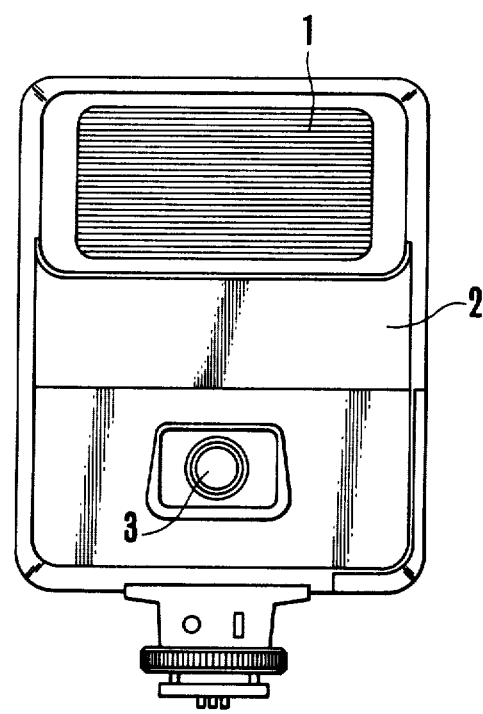
FIG. 1 is a front elevational view of a computer type electronic flash apparatus embodying the invention.
Figure 2:
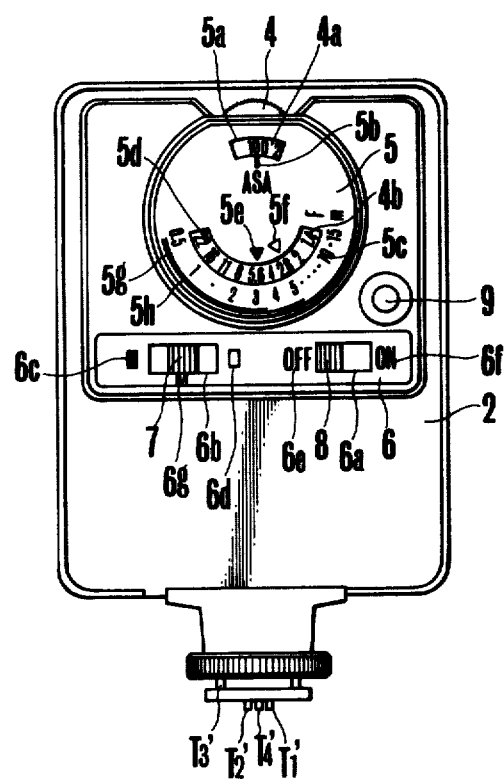
FIG. 2 is an elevational view of one embodiment of an indicating device according to the present invention constructed on the back of the flash apparatus of FIG. 1.

In FIG. 1, the front of a computer type electronic flash apparatus of the present invention has a flash light emitting window 1 in the front wall of a housing 2 and a light receiving window 3 in front of a light sensitive element such as a photo-transistor or photo-diode. In FIG. 2, showing the back of the flash apparatus of FIG. 1, a milled knob 4 permits setting the ASA sensitivity of the film used with the help of a film speed scale 4a behind the window 5a. Mark 5b is an index on the stationary disk plate 5. The rotary disk that carries the film speed scale 4a also bears a diaphragm scale 4b visible through an arcuate slot 5d in the stationary disk 5. A slidable switch 8 having "ON" and "OFF" positions serves as a main electrical power supply control switch and a lamp 9 is energized when the voltage of a main capacitor to be described later has reached a predetermined level.

A first display is composed of a plurality of marks, in this instance, two marks 6c and 6d with which a slidable knob 7 of an aperture size selector switch cooperates. A second display is composed of a plurality of arcuate lines of different length, in this instance, two lines 5g and 5h arranged in concentric relation to each other and to an arcuate scale 5c of camera-to-object distances to indicate respective first and second proper object distance ranges.

Now assuming that the computer type electronic flash apparatus has a guide number G.N.=16 when the film speed is ASA=100, as the milled knob 4 is turned to place the film speed scale 4a in registry at its particular graduation designated 100 with the stationary index 5b, the diaphragm scale 4b assumes the particular position shown in FIG. 2. Then all the radially aligned numeral characters between the diaphragm scale 4b and the distance scale 5c adjacent to the diaphragm scale 4b satisfy the relationship, i.e., (distance)×(diaphragm value)=16 in G.N. as can be seen from FIG. 2. The aperture size selector switch has a plurality of switched positions including positions corresponding to respective aperture sizes, in this instance, 5.6 and 2.8 which are settable in the circuit of the flash apparatus. Two indices 5e and 5f on the stationary disk 5 adjacent the window 5d for the diaphragm scale 4b are in radial alignment with graduations designated 5.6 and 2.8 respectively. For indication of the first proper distance range, the length of first arcuate line 5g of the second display means is adjusted to a limit corresponding to 2.83 meters at maximum because 16/5.6=2.83, while for the indication of the second proper distance range, the second proper distance range, the second arcuate line 5h terminates at a point corresponding to 5.66 meters. With the indicating device of such construction, it is preferable that the first index 5e, first mark 6c and first arcuate line 5g for the indication of the first proper distance range have a common single color, for example, red different from that which is common among the second index 5f, second mark 6d and second arcuate line for the indication of the second proper distance range, the latter color being green for example.

Figure 3:
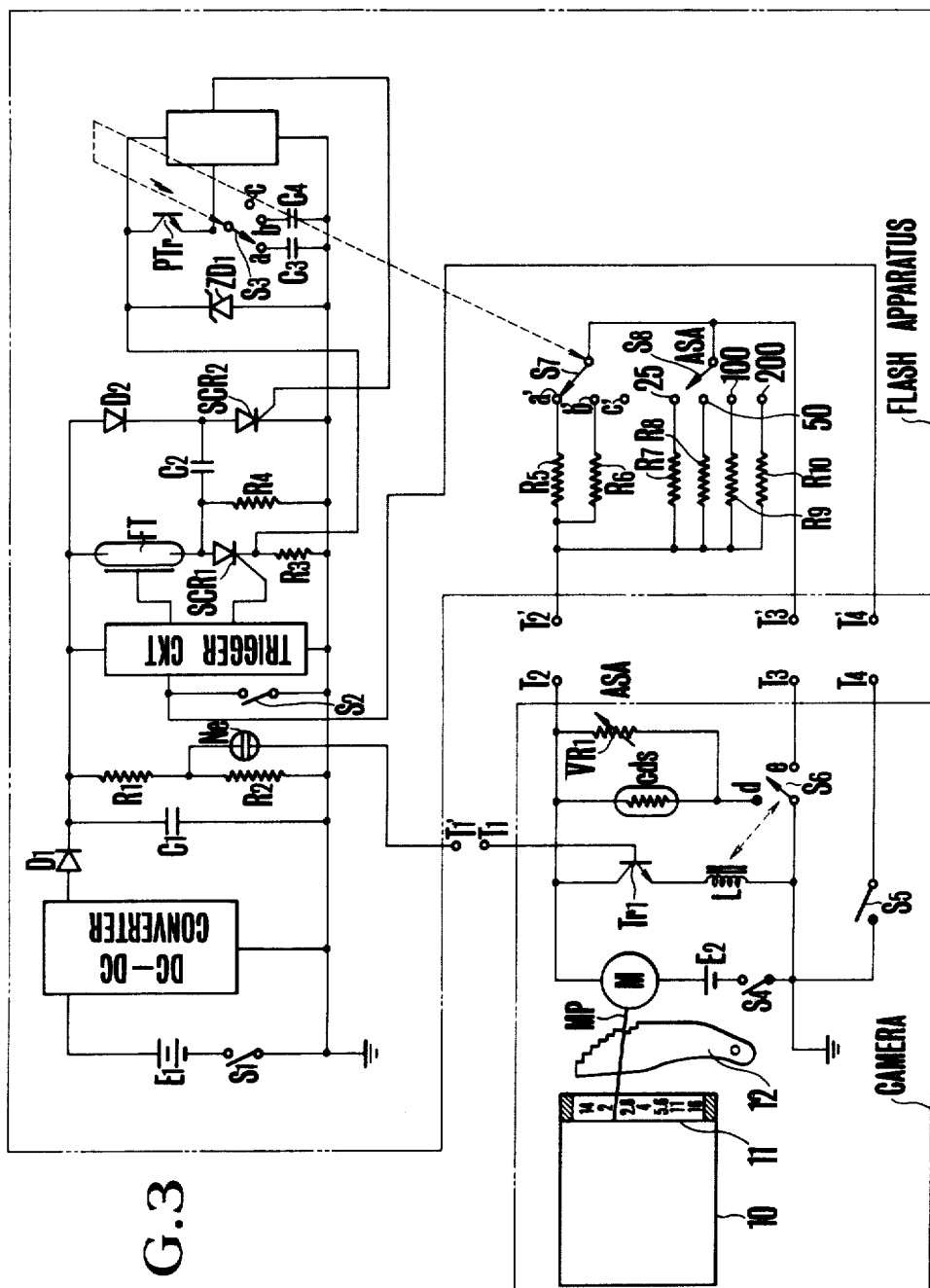
FIG. 3 is a schematic view, partly in block form, of the circuitry of the flash apparatus of FIGS. 1 and 2.

FIG. 3 shows the circuit of the computer type electronic flash apparatus of FIGS. 1 and 2 adapted for use with a camera having an automatic exposure control circuit. Here, an electrical power source or battery E1 energizes the circuit through a main power switch S1. A main capacitor C1 is connected to the battery E1 through a reverse current preventing diode D1 and a DC-AC converter. Hence, when switch S1 is closed, the capacitor CL is charged to a voltage above the break down voltage for the flash tube FT. The voltage of capacitor C1 is detected by a neon tube Ne seving as the lamp 9 of FIG. 1 and connected to the output terminal of a voltage divider of resistors R1 and R2 connected in series with each other and in parallel to the capacitor C1. A test flash switch S2 is connected to a trigger circuit CKT which is in turn connected to the trigger electrode of flash tube FT and to the gating control terminal of a first or main SCR1. The anode of SCR1 is connected to the cathode of FT, and the cathode of SCR1 is connected to the negative bus through a resistor R3 serving as a voltage source for a flash energy control circuit.

In the flash energy control circuit, a Zener diode ZD1 is connected parallel to the resistor R3. A phototransistor PTr is positioned behind the window 3 of FIG. 1, first and second timing capacitors C3 and C4 are selectively connected to the photo-transistor PTr by a circuit-transfer switch S3 associated with the slidable knob 7 of FIG. 2. A switching circuit having an input terminal connected to the output of either of the timing circuit PTr, C3, C4 has an output terminal connected to a gating control input terminal of a second SCR2. A commutating capacitor C2 is provided to apply a reverse voltage to the first SCR1 when the flash has reached a predetermined level. The capacitor C2 is previously charged through a diode D2. The circuit of flash apparatus further includes six resistors R5 to R10, two of which R5 and R6 are selectively connected between interconnection terminals T2' and T3' by the aperture size selector switch S7 associated with the slidable knob 7 of FIG. 2. The other resistors R7 to R10 are selectively connected between interconnection terminals T2' and T3' by a selector switch S8 as the film setting knob 4 is turned.

In the light metering circuit of the camera, a battery E2 is connected to the winding of galvanometer M whose needle MP extends into a diaphragm scale 11 positioned in the field of viewfinder 10 of the camera. The needle cooperates with a scanning member 12 in such a manner that when a shutter release button is depressed, the scanning member 12 with steps thereon is moved against the needle MP to thereby adjust the size of the diaphragm aperture. Connected in parallel to the galvanometer M are a photo-sensitive element CdS and a variable resistor VR1 for setting the sensitivity of the used film through an automatically operated switch S6 and a main switch S4 of the camera. Switch S6 has two switched positions "d" and "e" for CdS and VR1 and for interconnection terminal T3 respectively. The switch S6 is arranged to cooperate with a relay L in such a manner that when the voltage of the main capacitor C1 has reached the pretermined level, a transistor Tr1 having a base electrode connected through a pair of interconnection terminals T1 and T1' to the neon tube Ne is rendered conductive to energize the relay L. This sets the switch S6 from the position "d" to position "e." A synchro-switch S5 is arranged to be closed when the camera shutter runs down to the fully open position.

The operation of the computer type electronic flash apparatus of FIGS. 1 to 3 is as follows: A daylight exposure may be made by the camera of FIG. 3 when the terminals T1 to T4 of the camera are connected with the respective terminals T1' to T4' of the apparatus. The main switch S4 is closed while the main switch S1 of the flash apparatus is left open. In response to the light level sensed by CdS and the film speed set in VR1, the galvanometer M derives a proper diaphragm value which is displayed in the field of the viewfinder as the pointer MP assumes a particular deflected position. Upon depression of the shutter release button, the deflected pointer is scanned by the scanning member 12, and then the scanning result is introduced into a lens aperture mechanism not shown.

When a flash exposure is to be made, the main switch S1 is closed with the aperture size selector switch 7 moved to either of the right and left for the marks 6c and 6d. From this time on, the main capacitor C1 is charged by the battery E1 through the DC—DC converter. At a predetermined charge level, the neon lamp Ne is lighted up by the output voltage of the voltage divider circuit R1, R2. An actuating signal of the neon lamp Ne is applied through terminal T1'-and-terminal T1 connection to the base electrode of transistor Tr1. Hence, transistor Tr1 is turned "ON." The relay L is then energized to set switch S6 from its "d" position to its "e" position. It may, for example, be assumed that the aperture size selector switch 7 is set for mark 6c. Then, the switches S3 and S7 are set in their respective "a" and "a'" positions. Also, the film speed setting knob 4 may be turned to ASA=100 in registry with the index 5b. This establishes a closed circuit which can be traced as

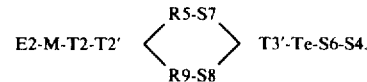

At this time, the deflected position of the pointer Mp is 5.6 on the diaphragm scale 11 because the resistance values of resistors R5 and R9 are previously adjusted to effect such result.

Upon depression of the shutter release button, the shutter starts to run down to the aperture fully open position with simultaneous closure of synchro-switch S5 which in turn causes the actuation of the trigger circuit CKT through terminal T4-and-terminal T4' connection. As the trigger signal of the trigger circuit CKT is applied to the trigger electrode of flash tube FT and also to the gating control terminal of the first SCR1, the flash tube FT starts to fire. A current flowing through TF and SCR1 provides a voltage across R3. The voltage, after being regulated to a constant level by the Zener diode ZD1 is applied to the flash energy control circuit. On the other hand, the flash light reflected from an object being photographed is received through the window 3 by the photo-transistor PTr. The capacitor C3 is charged up to a level at which the switching circuit is turned on and then the second SCR2 is turned on. Hence, the first SCR1 is turned off as the charge stored on the commutation capacitor C2 is applied as a reverse bias between the anode and cathode of SCR1 to terminate the duration of firing of the flash tube FT. The next flash exposure may be made after re-charging of the main capacitor C1 has been completed.

With this flash apparatus, if the photographer desires to ascertain whether or not the object to be photographed is within the proper distance range, he will first look at the slid position of the aperture size selector switch 7, and thereafter turn his observation to the indicating members 5g and 5h for the proper distance ranges provided on the same surface as that of the selector switch 7. Upon identification of that of the colors of the indicating members or arcuate lines 5g and 5h which matches that of the mark indicating the slid position of switch 7, he can read out the proper distance range for the object which he desires to shoot.

According to the indicating device of the present invention, therefore, owing to the fact that the aperture size selector switch 7 is located on the same side of the flash apparatus as that of the proper distance range indicating members 5g and 5h, there is no need to turn the electronic flash apparatus to different facing directions. This affords the advantages of reducing difficulties and improving manageability. In addition thereto, when the marks 6c and 6d for which the selector switch 7 is set are differentiated in color from each other but resembled in color with the indicating members 5g and 5h for the respective proper distance ranges corresponding to the marks 6c and 6d respectively. This produces the advantage of facilitating improvement of the accuracy and reliability with which the photographer may ascertain the proper object distance.

When the selector switch 7 is set from "6c" to "6d," S3 is set to "b" where PTr is connected to C4, and S7 is set to "b" where R6 is connected to the light metering circuit. Hence, the pointer PM of galvanometer M is deflected from 5.6 to 2.8. With this state of the flash apparatus, when the flash tube is triggered, the timing circuit C4, PTr starts to integrate the amount of flash light reflected from the object being photographed. In this case, the capacitance of C4 is previously adjusted to a value smaller than that of the capacitance of C3. Thus, the time interval necessary to charge C4 to the predetermined level is decreased by a factor proportional to the change from 5.6 to 2.8 with decrease in the amount of light emitted from the flash tube.

On the other hand, for indication of this charged diaphragm value, in this instance, 2.8, the photographer may look at the one of the indices 5e and 5f which has the same color as that of the mark 6d, that is, the index 5f which is aligned with 2.8 on the diaphragm value scale 4b. Then he may turn to the second proper distance range at 5h from which he can read out at a glance how far the flash appartus is effective.

On the other hand, when the film speed is changed from ASA=100, to 50, for example, the knob 4 is turned to place a graduation 50 in registry with the index 5b. As the film speed scale is shifted one graduation, the diaphragm scale 4b is also shifted one stop so that the diaphragm values 4 and 2 are in registry with the indices 5e and 5f respectively. At this time, the switch S8 is operated to select R8 instead of R9 for connection with the light metering circuit of the camera so that the aperture size of the lens aperture mechanism is adjusted to 4 or 2 when the selector switch 7 is set to 6c or 6d mark respectively.

In the above-mentioned embodiment, the flash apparatus is shwon as constructed separate from the camera and is combined with the camera when in use. The present invention is not limited to such form, and may be, of course, applied to a camera having a flash apparatus incorporated therein.

What is claimed is:

1. A combination of a camera and computer type electronic flash apparatus, comprising:
   the computer type electronic flash apparatus comprising:
   (a) a light sensitive circuit having integrating capacitors to be charged by a current proportional to light reflected by the object to be photographed;
   (b) an aperture selector movable between a first position and a second position for selecting a first aperture in the first position and a second aperture in the second position;
   (c) a stationary disk having numerals arranged in numerical sequence corresponding to various object distances;
   (d) a first linear indicating member provided on the stationary disk and extending a length corresponding to a first distance range which depends on the first diaphragm aperture value selected when the aperture selector is moved to the first position;
   (e) a second linear indicating member located on the stationary disk and extending a length corresponding to a second distance range which depends on the diaphragm aperture value selected when the aperture selector is moved to the second position;
   (f) first signal producing means to produce a first signal corresponding to the aperture value set by the aperture selector;
   (g) a switch associated with the aperture selector for adjusting the capacitance of capacitors in said light sensitive circuit in response to each of the positions selected by the aperture selector; and
   (h) control means connected to the light sensitive circuit for terminating a flash operation of the flash apparatus in response to the output signal from the light sensitive circuit; and
   the camera comprising:
   (a) a diaphragm, and
   (b) means responsive to the first signal for automatically adjusting the aperture size of the diaphragm;
      said flash apparatus including a flash window through which a flash passes and means for mounting the apparatus on the camera so the flash window points toward an object to be photographed with the camera;
      said aperture selector, said stationary disk, said first linear indicating member and said second linear indicating member forming a control arrangement; and
      said flash apparatus including access means for making said arrangement simultaneously visible and accessible to a photographer when said flash apparatus is mounted on the camera and when the photographer holds and points the camera and the flash window toward an object to be photographed, said access means including a face on said flash apparatus facing away from the flash window and toward the photographer when the flash apparatus is mounted on the camera and the photographer holds and points the camera and the flash opening toward an object to be photographed, said face having said arrangement mounted thereon.

2. A combination according to claim 1, wherein the stationary disk has arcuate slots forming a diaphragm scale and the film speed scale.

3. For a camera, a computer type electronic flash apparatus having an aperture size controlling device, said apparatus comprising:
  (a) a light sensitive circuit having integrating capacitors to be charged by a current proportional to light reflected by an object to be photographed;
  (b) an aperture selector movable between a first position and a second position;
  (c) a first mark near the first position, coded a prescribed color, and positioned on the same surface as the selector;
  (d) a second mark near the second position, coded a color different from that of the first mark, and positioned on the same surface as the selector;
  (e) a stationary disk having numerals arranged in numerical sequence corresponding to various object distances and positioned on the same surface as the selector;
  (f) a first linear indicating member located on the stationary disk and coded the same color as the first mark and extending a length corresponding to a distance range depending upon the first diaphragm aperture value selected when the aperture selector is moved to the first position;
  (g) a second linear indicating member located on the stationary disk and coded with the same color as the second mark and extending a length corresponding to a distance range which corresponds to the second diaphragm aperture value selected when the aperture selector is moved to the second position;
  (h) a rotatable dial exhibiting a diaphragm scale with at least the first aperture value and the second aperture value as well as a film speed scale with various film speed scale with various film speeds which are set;
  (i) aperture indices on the stationary disk to indicate the first and second aperture values on the dial;
  (j) first signal producing means to produce a first signal corresponding to the aperture value adjusted by the aperture selector and the film speed which has been set on the dial;
  (k) connecting means to transmit the first signal to the aperture size controlling device;
  (l) a switch associated with the aperture selector for adjusting the capacitance of capacitors in said light sensitive circuit in response to each of the positions selected by the aperture selector;
  (m) control means connected to the light sensitive circuit for terminating the flash operation of the flash apparatus in response to the output signal from the light sensitive circuit;
  (n) said flash apparatus including a flash window through which a flash passes and means for mounting the apparatus on the camera so the flash window points toward an object to be photographed with the camera;
  (o) said aperture selector, said stationary disk, said first linear indicating member and said second linear indicating member forming a control arrangement; and
  (p) said flash apparatus including access means for making said arrangement simultaneously visible and accessible to a photographer when said flash apparatus is mounted on the camera and when the photographer holds and points the camera and the flash window toward an object to be photographed, said access means including a face on said flash apparatus facing away from the flash window and toward the photographer when the flash apparatus is mounted on the camera and the photographer holds and points the camera and the flash opening toward an object to be photographed, said face having said arrangement mounted thereon.

4. An apparatus as in claim 3, wherein the stationary disk has arcuate slots for the diaphragm scale and the film speed scale.

5. An apparatus as in claim 3, wherein said dial includes a knob milled at the circumference thereof.

6. An apparatus as in claim 3, wherein the aperture selector is a slide switch.

7. A computer type electronic flash apparatus, comprising:
  (a) a light sensitive circuit having integrating capacitors to be charged by a current proportional to light reflected by the object to be photographed;
  (b) an aperture selector movable between a first position and a second position for selecting a first aperture in the first position and a second aperture in the second position;
  (c) a stationary disk having numerals arranged in numerical sequence corresponding to various object distances;
  (d) a first linear indicating member provided on the stationary disk and extending a length corresponding to a first distance range which depends on the first diaphragm aperture value selected when the aperture selector is moved to the first position;
  (e) a second linear indicating member located on the stationary disk and extending a length corresponding to a second distance range which depends on the diaphragm aperture value selected when the aperture selector is moved to the second position;
  (f) a switch associated with the aperture selector for adjusting the capacitance of capacitors in said light sensitive circuit in response to each of the positions selected by the aperture selector;
  (g) control means connected to the light sensitive circuit for terminating a flash operation of the flash apparatus in response to the output signal from the light sensitive circuit;
  (h) first means for forming a first window to permit passage of a light flash and a second window to permit passage of light to said light sensitive circuit and for holding said windows to face the object to be illuminated; and
  (i) second means for holding said stationary disk, said first linear indicating member, said second linear indicating member, and said aperture selector so they face in a direction opposite said windows.

* * * * *